(12) United States Patent
Beck

(10) Patent No.: US 7,506,523 B2
(45) Date of Patent: Mar. 24, 2009

(54) METHOD OF MAKING HOLLOW INORGANIC MICROSPHERES, AND PRODUCTS MADE THEREBY

(76) Inventor: Warren R. Beck, 942 Winterberry Dr., Woodbury, MN (US) 55125

( * ) Notice: Subject to any disclaimer, the term of this patent is extended or adjusted under 35 U.S.C. 154(b) by 98 days.

(21) Appl. No.: 11/192,241

(22) Filed: Jul. 29, 2005

(65) Prior Publication Data

US 2006/0096318 A1    May 11, 2006

Related U.S. Application Data

(63) Continuation-in-part of application No. 10/983,318, filed on Nov. 8, 2004, now abandoned.

(51) Int. Cl.
  *C03B 9/00*   (2006.01)
  *C03B 19/10*  (2006.01)
  *C03B 23/00*  (2006.01)
  *C03B 37/00*  (2006.01)

(52) U.S. Cl. .......... 65/21.4; 428/384; 428/367; 264/5

(58) Field of Classification Search ............ 65/21.4; 428/313.3
See application file for complete search history.

(56) References Cited

U.S. PATENT DOCUMENTS

2004/0081827 A1* 4/2004 Datta et al. .......... 428/384

* cited by examiner

*Primary Examiner*—Philip C Tucker
*Assistant Examiner*—Phu H Nguyen

(57) ABSTRACT

This invention relates to a low cost method of converting solid glass or ceramic microparticles into hollow microspheres by feeding them, along with pulverized coal, into coal-powered furnaces. Coal-powered furnaces generally produce micro-sized fused particles of the ash in the coal—called fly ash; and some of the fly ash particles may be hollow. By the present invention the yield of hollow microparticles is greatly increased by co-feeding, along with the pulverized coal, very small amounts of microparticles of inorganic materials known to have the ability to form hollow microspheres upon fusion.

6 Claims, No Drawings

METHOD OF MAKING HOLLOW INORGANIC MICROSPHERES, AND PRODUCTS MADE THEREBY

CROSS REFERENCE TO RELATED APPLICATIONS

This application is a continuation in part of U.S. Ser. No. 10/983,318, filed Nov. 8, 2004, now abandoned, the disclosure of which is herein incorporated by reference.

BACKGROUND

Power plants that use pulverized coal as the combustible energy source produce, as a by-product, microsized fused particles of the ash contained in the coal. These particles generally take the form of glassy microspheres, and are called fly ash. The ash content of coals used for power generation generally varies from around one to ten percent of the weight of the coal. In some modern plants equipped to handle it, the ash content is even up to twenty percent. This ash generally is composed primarily of silica and alumina which average 50% to 60%, and 20% to 25%, respectively, of the weight of the ash. These two components are generally present in the coal, and make up the major portion of the ash. In addition to the alumina and silica, coal ash usually contains a significant amount of iron oxide, which is usually up to a few percent of the ash weight, but can range up to 10% or more. Minor amounts of many other oxides such as the oxides of titanium, calcium, magnesium and potassium, are usually present. These ash compositions are generally good glass formers.

Upon passing through the boiler furnace of a power plant the coal particles burn and the ash content of each particle fuses. This "fly ash" product is usually collected by electrostatic precipitators, and is sold in large tonnages for concrete highway construction, high rise building construction, and similar uses.

A small fraction of fly ash, usually around one percent of the ash produced, is in the form of hollow microspheres and will float on water. Those power plants which have settling water ponds are able to separate the floating fly ash from the denser fly ash, and recover it as a hollow glass microsphere product which is called "cenospheres." This product is generally about 0.7 to 0.8 grams per cubic centimeter in average particle density, and is therefore much more valuable than the denser fly ash. It is sold for use as a filler in light weight products such as plastics, putties, and concrete.

In contrast to the miniscule yield of cenospheres in fly ash the technology of commercial hollow glass microspheres has become advanced enough so that nearly 100% of the precursor feed particles fed into "bubble" formers will float on water. Hollow microspheres of this type are marketed by a number of companies, and a range of useful compositions for the microspheres has been taught in published literature. Blowing agents are incorporated into the glass so that, when heated above the fusion temperature of the glass, the gas is released to blow the particle into a bubble. These "bubbles" are produced with particle densities much lower than that of cenospheres, and usually average from around 0.4 down to around 0.1 grams per cubic centimeter. They therefore have a much higher market value than cenospheres, and sell for a higher price. These commercial bubbles are generally colorless, in contrast to the usual dark color of cenospheres.

SUMMARY

My invention is a low cost method of producing hollow microspheres or microbubbles. This is done by feeding inorganic bubble-forming precursor microparticles, along with pulverized coal, through coal-burning furnaces. In the furnace the microparticles are subjected to conditions that cause the microparticles to blow into microbubbles. The term "bubble-forming precursor microparticle" means herein particles that are formulated or selected to be bubble-forming, i.e., to have a statistically large conversion to bubble form when passed through a furnace. By the invention the yield of hollow microparticles is greatly increased by co-feeding, along with the pulverized coal, very small amounts of microparticles of inorganic materials known to have the ability to form hollow microspheres upon fusion.

In brief summary, my invention is a method of making hollow glassy microspheres by co-feeding into a furnace, along with pulverized coal, microparticles of inorganic, bubble-forming glass, ceramic, or mineral, wherein the co-fed microparticles blow to form microbubbles, and collecting the formed microbubbles.

DETAILED DESCRIPTION

In carrying out my invention, inorganic bubble-forming precursor microparticles are fed, together with pulverized coal, through coal-burning furnaces. In the furnace the inorganic microparticles—which are generally of glass, ceramic or mineral composition—are exposed to heat that raises their temperature above the bubble-blowing temperature, which is generally 1100 degrees C. or more. The microparticles are generally mixed into the pulverized coal when fed into the furnace, though they can also be fed in separately, using conventional feeding mechanisms such as a fluidized bed powder feeder. The mixture of pulverized coal and microparticles enters the combustion chamber of the furnace, often as a fluidized bed in which the coal and microparticles are entrained in air or oxygen. The microparticles are generally not combustible in the conditions experienced, but instead are generally inert except for the expansion and formation of a hollow space or spaces within the microparticle. The conditions for operating the furnace generally need not be changed because of the addition of the bubble-forming microparticles.

The bubble-forming precursor particles have a statistically large conversion to bubble form when passed through a bubble-forming furnace, i.e., a conversion akin to that of the commercial bubble-forming processes rather than the approximately one percent conversion of fly ash in coal-fired power plants. The microbubbles (hollow particles having a density less than that of water) produced from the expanded precursor microparticles are generally collected with the ash of the furnace combustion process and then conducted to a settling pond, where they float and are collected. Further size and density classification of the floated and collected product can be performed by known techniques, preferably after first drying the product. In general, the microbubbles formed from the added microparticles have properties, such as size and density, similar to those obtained by passing the microparticles through conventional bubble-forming equipment.

When the time-temperature cycle experienced by the microparticles in the furnace is dictated by optimization of the combustion process rather than optimization of the bubble-forming process, particle size and composition of the microparticles can be chosen to best match the conditions in the furnace. For example, larger particle sizes can be used if the temperature that the microparticles will experience in the furnace is significantly higher than 1100 degrees C. Such larger particle sizes—for example, two or three times or more larger than the usual size of microparticles introduced into a commercial bubble-former—will lengthen the softening period for the particles and tend to prevent them from exploding rather than forming a bubble. Also, composition can be adjusted to increase softening temperature, for example, by including more of the refractory oxides such as silica and/or less of the fluxing oxides such as alkali metal oxides or boron oxide. The optimum composition and particle size can be determined empirically and adjusted to best match the furnace temperature and residence time.

Bubble-forming microparticles can be added to pulverized coal in a variety of proportions. Inclusion of a small amount will not change the combustion conditions significantly. Amounts as small as 0.1 percent of the weight of the coal can produce significantly increased production of hollow microsphere product. Higher amounts of microparticles such as 1 or 2 percent of the weight of the coal can also be used, depending on factors such as the capacity to handle and separate larger quantities of formed hollow microspheres. Sufficient precursor particles should be included, e.g., by an intentional addition to the combustible ingredient, to provide economic benefit to collecting and processing the formed bubbles.

I prefer to use as my precursor particles glass compositions of the type made by existing manufacturers of "glass bubbles." Some examples are those taught in U.S. Pat. Nos. 3,365,315 and 4,391,646. Other possible feed materials may include amber glass, natural minerals such as perlite, fused bloatable clay, or inorganic materials known to have latent gas or gas forming content. These inorganic materials may be called glass-formers, and they have the ability to form hollow glassy microspheres upon fusion. The precursor particles are formulated or selected to include a blowing agent that causes the microparticle to blow into a bubble in the heat of the furnace. The size of microparticles used depends in part on the size of microbubble to be produced, but generally the microparticles are in a size range of 5 to 50 microns. Typically, the microbubbles formed are about twice the size of the feed microparticles.

Many electric power plants in the U.S. and around the world presently collect and market the fly ash by-product formed by the fusion of the ash in each particle of coal. Coals usually contain at least several percent of ash. Usually around one percent of this fly ash is low enough in density to float on water. It may be floated on settling ponds, collected and dried, and sold as "cenospheres". Commercial cenospheres have average particle densities generally around 0.7 to 0.8 grams per cc. and are sold for high rise concrete construction and other uses. My proposal is to feed a small amount of bubble forming microparticles, usually 1% to 2% the coal weight. This should result in up to 100 fold increase in hollow microsphere yield, and its density should be significantly lower than the presently produced cenospheres. With proper feed material, the true density could be reduced to 0.4 or lower.

My process will result in a lower density by-product than presently marketed cenospheres, and the product will be lower in cost than hollow glass microspheres made by other processes, because the only capital expense needed is that for a feeder to admix the raw microparticles with the pulverized coal. The yield would be higher, and the density lower. Selling price would likely be several times that for present cenospheres.

What is claimed is:

1. Method of making hollow inorganic microspheres in a coal-burning furnace that is part of an electric power plant and has a combustion chamber comprising 1) co-feeding into the combustion chamber a) pulverized coal that burns as the energy source for the furnace, and b) inorganic non-combustible bubble-forming precursor microparticles in an amount less than 1% the weight of the coal, wherein the co-fed microparticles blow to form microbubbles, 2) collecting the formed microbubbles with the ash of the furnace combustion process, and 3) conducting the collected microbubbles and ash to a settling pond, where the microbubbles are floated and collected.

2. The method of claim 1, wherein the weight of co-fed microparticles is at least 0.1% the weight of the coal.

3. The method of claim 1, wherein the co-fed microparticles comprise glass bubble precursor particles.

4. The method of claim 1, wherein the co-fed microparticles comprise amber glass.

5. The method of claim 1, wherein the co-fed microparticles comprise the mineral perlite.

6. The method of claim 1, wherein the co-fed particles comprise fused bloatable clay.

* * * * *